(12) United States Patent
Asawa et al.

(10) Patent No.: US 7,590,070 B1
(45) Date of Patent: Sep. 15, 2009

(54) SYSTEM AND METHOD FOR DISCRETIONARY MULTIPLEXING AND COMPRESSING IN A COMMUNICATIONS ENVIRONMENT

(75) Inventors: Manjari Asawa, Cupertino, CA (US);
Tmima Koren, Cupertino, CA (US);
Jagdish V. Sonti, Cupertino, CA (US);
Rong Wang, Cupertino, CA (US);
Walter L. Robinson, Raleigh, NC (US);
Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 1064 days.

(21) Appl. No.: 10/770,995

(22) Filed: Feb. 3, 2004

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/252; 370/230; 370/231; 370/328

(58) Field of Classification Search .............. 370/328, 370/336, 338, 395, 477, 452, 554, 395.1, 370/202, 521, 252, 230–235, 437, 468
See application file for complete search history.

(56) References Cited

U.S. PATENT DOCUMENTS

| | | | |
|---|---|---|---|
| 5,894,557 A | 4/1999 | Bade et al. | 395/200.58 |
| 6,134,245 A | 10/2000 | Scarmalis | 370/474 |
| 6,192,051 B1 | 2/2001 | Lipman et al. | 370/389 |
| 6,363,065 B1 | 3/2002 | Thornton et al. | 370/352 |
| 6,400,722 B1 | 6/2002 | Chuah et al. | 370/401 |
| 6,445,689 B2 * | 9/2002 | Bruenle | 370/336 |
| 6,477,595 B1 | 11/2002 | Cohen et al. | 710/105 |
| 6,512,754 B2 | 1/2003 | Feder et al. | 370/338 |
| 6,512,773 B1 | 1/2003 | Scott | 370/395.61 |
| 6,618,384 B1 * | 9/2003 | Elliott | 370/396 |

* cited by examiner

*Primary Examiner*—Eugene Yun
(74) *Attorney, Agent, or Firm*—Baker Botts L.L.P.

(57) ABSTRACT

A method for compressing information is provided that includes receiving a plurality of bits associated with a communications flow and electing whether to perform compression and multiplexing operations based on a level of traffic propagating in a network.

25 Claims, 3 Drawing Sheets

SYSTEM AND METHOD FOR DISCRETIONARY MULTIPLEXING AND COMPRESSING IN A COMMUNICATIONS ENVIRONMENT

TECHNICAL FIELD OF THE INVENTION

The present invention relates in general to the field of communications and, more particularly, to a system and a method for discretionary multiplexing and compressing in a communications environment.

BACKGROUND OF THE INVENTION

Communication systems and architectures have become increasingly important in today's society. One aspect of communications relates to maximizing bandwidth and minimizing delays associated with data and information exchanges. In compression scenarios, network operators generally seek to produce high percentages of gain in compression for any given transport that is being implemented. Additionally, network operators should consider communication patterns, such as periods of peak traffic when links are being heavily utilized. Other time periods may include intervals of inactivity and dormancy, where link capacities are not being tested/realized.

Many proposed solutions for effectuating proper data exchanges add significant overhead and cost in order to accommodate a large number of end users. For example, a large number of T1/E1 lines may be implemented, but such lines are generally expensive and, thus, each one should be maximized in order to achieve optimal system performance. Accordingly, the ability to provide a communications system that consumes few resources, optimizes bandwidth, and achieves minimal delay (while accounting for periods of robust or dormant network traffic) presents a significant challenge for network designers, service providers, and system administrators.

SUMMARY OF THE INVENTION

From the foregoing, it may be appreciated by those skilled in the art that a need has arisen for an improved compression/multiplexing approach that optimizes data exchanges in a communications environment during various time intervals. In accordance with one embodiment of the present invention, a system and a method for providing discretionary compressing/multiplexing operations in a communications environment are provided that substantially eliminate or greatly reduce disadvantages and problems associated with conventional compression techniques.

According to one embodiment of the present invention, there is provided a method for compressing information in a communications environment that includes receiving a plurality of bits associated with a communications flow and electing whether to perform compression and multiplexing operations based on a level of traffic propagating in a network.

Certain embodiments of the present invention may provide a number of technical advantages. For example, according to one embodiment of the present invention, a communications approach is provided that enhances bandwidth parameters for a given architecture. This is a result of the communications scheme, which provides bandwidth gains over a variable size frame/packet backhaul. This may be beneficial to service providers as compression protocols reduce their operating expenditures.

This enhancement to compression/multiplexing protocols may also ensure that this function is enabled when the need to conserve bandwidth is most important. Such a feature provides a way to detect IDLE channels and then to trigger compression. This provides an ability to negotiate turning compression ON/OFF in response to changes in traffic parameters. This operation may also provide a way to bridge the frames across circuit and packet/frame paths seamlessly. There are generally four types of states associated with a given channel: an IDLE state, an ERROR state, an ACTIVE, and a SILENCE state.

Note that network users experience latency and poor voice quality during peak/near peak traffic periods. Bandwidth savings/optimization is achieved by the present architecture when it is most critical: during busy periods. Additionally, such an architecture is user-configurable, as ON and OFF thresholds may be set such that the architecture conforms to a desired set of traffic or volume parameters. In addition, compression and multiplexing that is enabled only during busy time intervals ensures two things: 1) during busy times bandwidth is optimized (at the expense of latency); and 2) during non-peak time, latency is nil. This achieves the best of both worlds by providing no latency almost all of the time, but offering more latency and better compression during busy periods. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
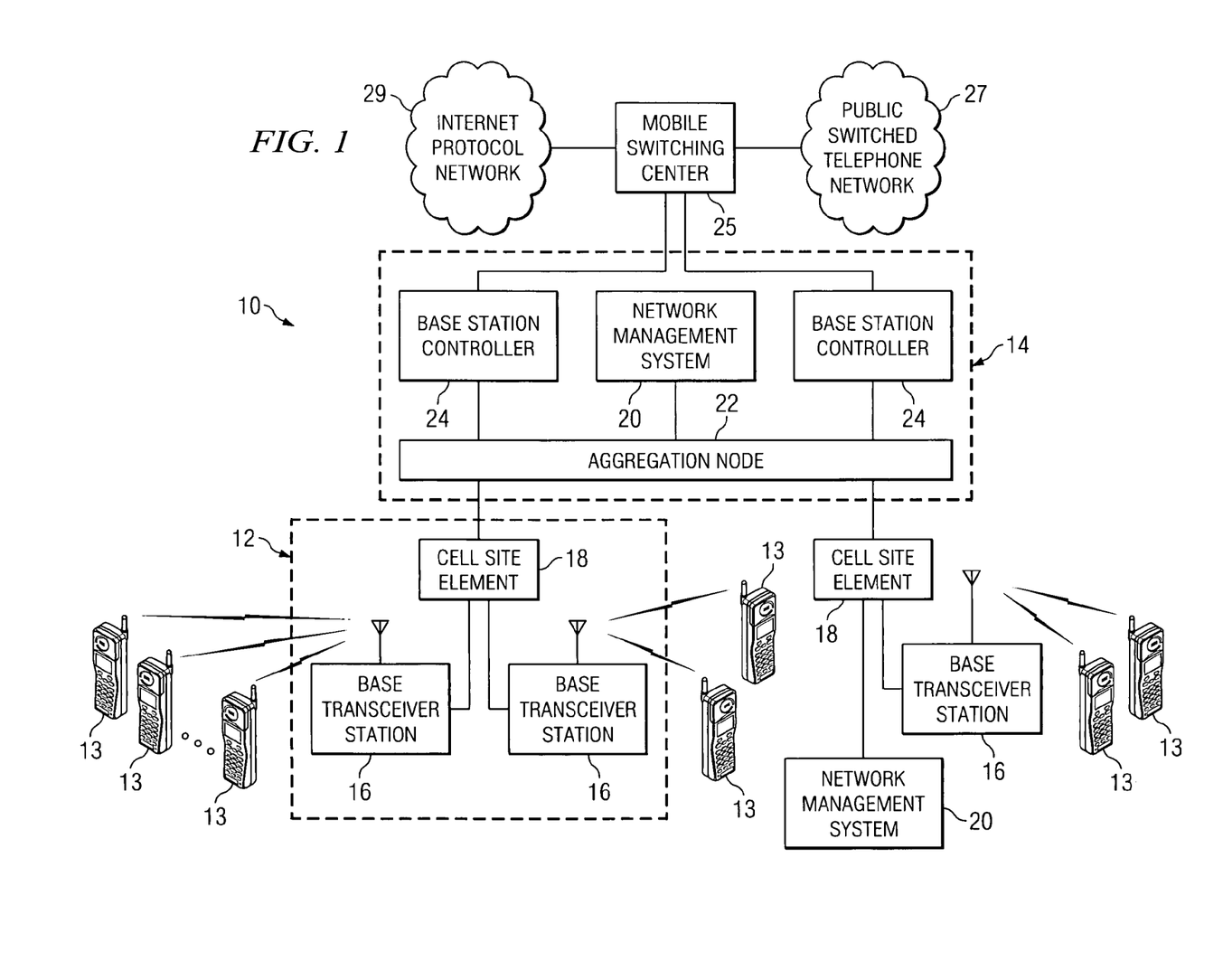
FIG. 1 is a simplified block diagram of a communication system for compressing and multiplexing data.

FIG. 1 is a simplified block diagram of a communication system 10 for compressing data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an internet protocol (IP) network 29.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end users, subscriber units, or mobile stations 13 may be multiplexed over the time domain.

In accordance with the teachings of the present invention, a discretionary compression and multiplexing approach is provided that optimizes bandwidth and latency parameters in a network environment. Communication system 10 provides an architecture in which cell site element 18 and/or aggregation node 22 executes compression protocols in order to reduce the amount of bandwidth required for GSM data exchanges (e.g. phone calls) that may be transmitted on backhaul lines. The scheme offered by communication system 10 potentially provides significant bandwidth gains over variable size frame/packet backhaul. Communication system 10 provides benefits during periods of high end-user usage/activity. Note that latency parameters may suffer and service for all users may be degraded because such a protocol operates to gather sufficient bits from each sub rate circuit to perform packetization.

Communication system 10 operates in a GSM environment, whereby information that is received by cell site element 18 is in a TDMA format. The incoming data stream may be taken and a determination may be made for the data stream (i.e. whether to compress the stream) before it is transmitted on the backhaul. Cell site element 18 may compress the data stream in various suitable ways before packetizing the information and sending it to aggregation node 22. Aggregation node 22 may complete a series of reverse operations, whereby the information is decompressed and demultiplexed before being converted back into a TDMA format such that the next-hop device can receive it in the form it expects (i.e. the form that would have been received were it not for the compression and multiplexing operations). A certain amount of data should be captured before it is compressed at cell site element 18 (the inbound link). Thus, a latency delay will occur there. Latency may be added to a voice call at this location. This may result in some delay for a user on the network.

Communication system 10 enables compression when compression is most critical (i.e. when a link is near capacity). At various times (e.g. most of the day and at night), when there are not that many calls occurring, the extra bandwidth achieved by compression operations is not needed. Thus, the compression protocols may be disabled, whereby the latency and other voice-impact parameters move to normal conditions. At busy times (e.g. right after conventional work hours), when there are many calls occurring and the link is being heavily utilized, the compression protocol may be enabled. This accommodates a larger number of calls at the expense of adding some latency. Control information (e.g. via a control channel) may be used by cell site element 18 to communicate to the other side (i.e. aggregation node 22) that the compression and multiplexing is being enabled or disabled. This cooperation and awareness allows for the dynamic switching of these operations.

It is critical to note that any number of compression protocols may implement such enabling/disabling techniques. In one example compression scenario, bits may be taken that are associated with the calls and the bits may be compressed in order to reduce the T1/E1 allocations or time slots being implemented for a given number of GSM phone calls on the backhaul. Certain techniques applied to GSM A-bis compression may focus on compressing the raw time-division multiplexed (TDM) data stream, using pattern recognition techniques that scan for certain repetitive bit patterns (e.g. a series of eight 1s) and then use a lookup database to define the pattern allowing it to be replaced with a symbolic representation (i.e. a code word). These types of methods may benefit from communication system 10.

In an example implementation, communication system 10 may leverage such protocols or, alternatively, address these deficiencies by tracking the state of the TDM stream and representing the state of the A-bis voice or data call by a context. This context may be maintained for each sub-rate digital signaling zero (DS0) of the GSM A-bis bearer stream and may be efficiently translated into commands for the compressor and decompressor. In addition, the state can be ascertained from the GSM 8.60 channel within the first thirty-two bits. Note that GSM 8.60 refers to the 16 kb/s subrate channel (two-bits per time slot), while GSM 8.61 refers to the 8 kb/s subrate channel (one-bit per time slot). A number of protocols may be used in order to achieve the teachings of communication system 10; the preceding, as well as the following, description offers some examples for purposes of discussion and teaching.

Communication system 10 may lock onto and track the state of a GSM (A-bis) channel. A TDM stream may consist of one to twenty-four or one to thirty DS0s, depending on the link layer technology (e.g. T1 or E1). Within a DS0, the GSM A-bis interface may break the DS0 into four separate channels. With a separate channel, each channel being independent, a compression technique may be applied as follows. The first bit in the channel is evaluated. Any suitable element (e.g. a state machine) may be implemented to evaluate the stream. The state machine may track the stream and look for bits that reveal the state of the channel.

Once the position of the frame within the TDM stream is defined, the frames may be segmented into smaller subframes. During processing of the subframes, state machine logic may be applied to the stream. After arriving at the valid frame state, the logic may seek to identify various bit patterns defined by the GSM specification. In cases where synchronization is lost with base transceiver station 16 or base station controller 24, then a shift could be made from the valid frame mode to the unknown mode. During that time, known data may be transmitted to the peer. Hence, a replication may be occurring that would normally be done by base station controller 24 (or a peer). This is because in cases where synchronization bits are not received, a frame is generally supposed to be dropped. Communication system 10 addresses this issue by not even transmitting the frame to the peer and allowing the peer to discard the frame. Instead, the frame may be dropped on the compressor side of the architecture. The state of the subrate channel may be tracked and data sent only where the channel is in the correct state.

Mobile station 13 is an entity, such as a client, subscriber, end user, or customer that seeks to initiate a communication session or data exchange in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, layer one based (e.g. time division multiplexed (TDM), GSM, 8.60) or layer two based (e.g. Frame Relay, high level data link control (HDLC), asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex together payloads from the layer two based traffic that have a common destination. The multiplexed payloads, as well as any payloads extracted from the network management system IP or Ethernet traffic, may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any land line telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/internet protocol (TCP/IP) communication language protocol in a particular embodiment of the present invention. However, IP network 29 may alternatively implement any other suitable communications protocol for transmitting and receiving data packets within communication system 10.

In operation, a multiplexing function may be configured that samples the compressed GSM 8.60 stream to collect a fixed size payload (e.g. 8/16/32/64-bit) and transfers the payload to the peer demultiplexer, which may deliver the payload to the decompressor. This operates to maximize the efficiency of the back-haul. The compressor generally does not return bits to the multiplexer unless there are sufficient bits to fill the payload (i.e. 8/16/32/64-bits), which introduces an inherent but small sampling delay. The compressor may also represent the command state by passing through the GSM 8.60 CONTROL words to the multiplexer. The use of this fixed size payload and control word pass-through has a number of advantages. For example, no payload length field is required by the UDPmux function. This means that small payloads can be used to minimize delay without incurring significant overhead in terms of variable field length representation. Additionally, no explicit control protocol needs to be defined: eliminating the need to break up the payload fields (i.e. to insert control) or to use an out-of-band control protocol, which may consume even more bandwidth. Such an architecture provides for an alignment of the transport data stream with the state of the GSM sub-rate circuit. This operation is effectively combined with multiplexing of fixed size payloads data from multiple DS0s on the same circuit and results in a computationally simpler and bandwidth efficient solution.

Propagation delay and time synchronization procedures (PATE) may be used to adjust the sub-rate channel frame alignment in order to make sure that the frames arrive from the base station controller to the base transceiver station in time for over-the-air transmission. If jitter is caused by the transport solution, the PATE control loop might struggle to stabilize and, therefore, the system should generally behave like a TDM circuit by adding a constant amount of delay.

The compression solution offered by communication system 10 may use pseudo-wire emulation (PWE) [i.e. circuit-emulation services or CBS] for transport of frames across the back-haul link. One hop (point-to-point) may be used, allowing network delay/jitter to be suitably controlled. The GSM-mux compression may use circuit emulation services (CES) for sampling, transport, and replay of TDM samples. Once sampled, the GSM 8.60 specific payload compression may be applied in order to reduce the required transport network bandwidth. Additional details relating to these operations are provided below with reference to FIGS. 2A-B.

In operation, the proposed enhancement to compression/multiplexing protocols ensures that the packet devices at both ends perform compression/multiplexing when there is a need to save bandwidth. Communication system 10 can dynamically enable or disable compression based on link utilization.

The protocol may behave as follows. Based on supported codec types and potential bandwidth savings from the compression/multiplex process, thresholds for turning compression ON/OFF may be calculated and configured by any suitable authorized entity. This may be tunable via, for example, a user interface. In one example embodiment, the threshold for turning on the scheme is generally 75% to 90% link utilization on the span from cell site element 18 to base transceiver station 16. The threshold for turning off the scheme may be in the range of 35% to 45% (potentially accounting for hysteresis on the long haul span).

For a given E1 link, the method may incrementally add groups of DS0s for compression based on the value of n. For example, if n=one, the scheme is turned on for the whole E1. If n=two, there are two DS0 groups. Incremental thresholds may be configured for enabling compression for each DS0 group. It may not be advantageous to create too many groups. Optimal values of n may be determined through further analysis and based on particular needs. The GSM framer function currently identifies IDLE channels. The function is extended to count the number of IDLE channels per E1 or per DS0 group (if n>one). If the threshold for turning on compression is exceeded, one of the DS0 groups with the requisite number of IDLE channels is selected for compression.

Via signaling, the peer at one end may be informed of the DS0 group that has been designated for compression as well as when the switch will occur. When the peer acknowledgement is received, a switch from circuit to packet/frame transport may occur. Most of the superframes may be split across circuit and packet/frame paths. This method provides a way to bridge the two data paths (upon switching seamlessly) without corrupting the frames or discontinuing the compression. For service providers (that are tolerant of frame loss), the superframe in transit could be dropped. When traffic drops below a threshold, identified DS0 groups may pass through the GSM framer for monitoring IDLE frames (but thereafter experience a pass through or null function in cell site element 18). This provides minimal delay being added to these frames.

This process ensures that the compression/multiplex function is enabled only when there is a need to save bandwidth. This further provides a way to detect IDLE channels and to trigger activation of compression and multiplexing. Communication system 10 also offers a way to negotiate turning compression ON/OFF in band and also provides a way to bridge the frames across circuit and packet/frame paths seamlessly. The present architecture capitalizes on the fact that network users may experience latency and poor voice quality during peak/near peak traffic periods. In accordance with the teachings of communication system 10, bandwidth optimization is achieved when it is most critical: during busy periods. The architecture is user-configurable, as ON and OFF thresholds may be set such that the architecture conforms to a desired set of parameters. In addition, compression and multiplexing that is enabled only during busy time intervals ensures two things: 1) during busy times bandwidth is optimized; and 2) during less busy times latency is nil. This benefit is two-fold in providing no latency almost all of the time, but offering more latency and better compression during periods of robustness.

Figure 2A:
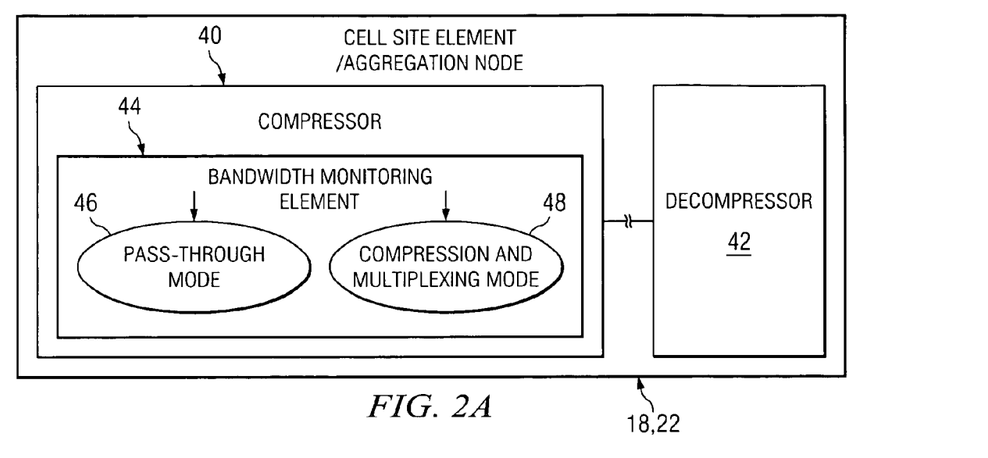
FIG. 2A is a simplified block diagram of an internal structure associated with either a cell site element or an aggregation node of the communication system.

FIG. 2A is a simplified block diagram of the internal structure of either cell site element 18 or aggregation node 22. It is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

Each of these elements may include a compressor 40 and/or a decompressor 42 where appropriate. Compressor 40 may include a bandwidth monitoring element 44 that is operable to selectively switch compression ON and OFF. In an example embodiment, software included in bandwidth monitoring element 44 may be used to effectuate this discretionary compression for voice or packet data applications. Such a decision may be made on the basis of existing traffic conditions. Bandwidth monitoring element 44 may have a number of modes associated with it. Bandwidth monitoring element 44 may make decisions as to which actions should be taken (if any) by compressor 40. In one 'pass-through' (or repeater) mode 46, data may be unaffected because of light traffic conditions in the network. In such cases, compression is not performed for the given data stream. In a compression and multiplexing mode 48, compression and multiplexing operations are triggered by bandwidth monitoring element 44. Compressor 40 responds by executing such operations on a given data stream.

Thus, bandwidth monitoring element 44 may toggle between the two modes in order to achieve the teachings of communication system 10.

Alternatively, such selective compression and multiplexing may be achieved by any suitable hardware, component, device, application specific integrated circuit (ASIC), additional software, processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22 or anywhere outside of compressor 40. In such cases, it could readily be provided as a separate component, device, or module.

Figure 2B:
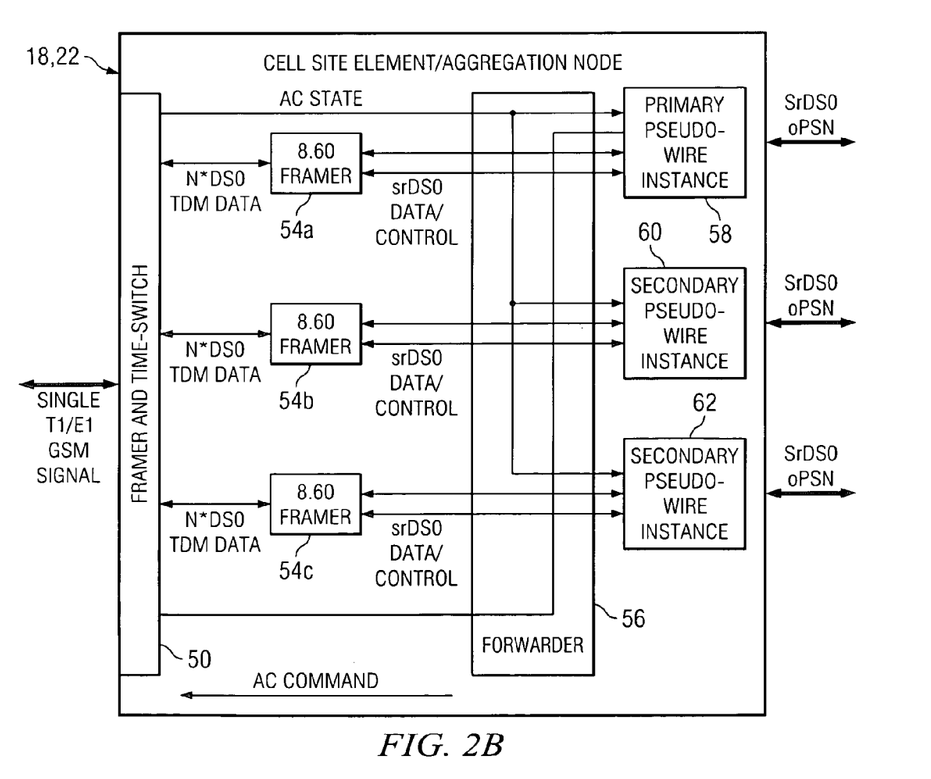
FIG. 2B is a block diagram of an example internal structure associated with either a cell site element or an aggregation node of the communication system.

FIG. 2B is a simplified block diagram of either aggregation node 22 or cell site element 18 in accordance with an example implementation of the present invention. Each aggregation node 22 or cell site element 18 may include a framer and time-switch element 50, multiple 8.60 framers 54*a-c*, a forwarder 56, a primary instance 58, and secondary instances 60 and 62. Each of aggregation node 22 and cell site element 18 may perform similar compression and data management techniques and implement the use of a state machine that is provided therein. Additionally, it should be noted that because primary pseudo-wire instance 58 and secondary pseudo-wire instances 60 and 62 are capable of performing compression and decompression operations, each of these elements (as described above) may include a decompressor and/or a compressor where appropriate. Each of these elements may also include any suitable hardware, software, object, or element operable to execute one or more of their functionalities. Additionally, such elements may be inclusive of suitable algorithms that operate to distribute data properly in a communications environment. Appropriate algorithms and software may be used in order to identify the type of signal (or information associated with the signal or link) or the state of the channel that is provided between base transceiver station 18 and base station controller 24.

Emulation may be provided for standard TDM signals. Cell site element 18 or aggregation node 22 may terminate the attachment circuit (AC) that, in an example embodiment, is a structured T1/E1 link that complies with GSM 8.60 framing. The pseudo wire (PW) is a logical construct that takes the sub-rate (sr) DS0 data/control stream and transports it over a corresponding packet switch node or network (PSN). Each of primary instance 58, and secondary instances 60 and 62 may provide 8.60 specific payload compression before transmission over the PSN. Multiple streams may be multiplexed onto one transport payload.

Aggregation node 22 or cell site element 18 may separate a GSM signal at framer 50 such that it is broken into multiple DS0s (e.g. 64 k-bit channels). 8.60 framers 54*a-c* may then break down individual time slots. The decision process of enabling and disabling of the framing (i.e. compressing and multiplexing) may be executed via 8.60 framers 54*a-c*. This may be achieved by a switch included in 8.60 framers 54*a-c*, which decides whether the information incoming to cell site element 18 should be forwarded (as is) or whether the information should be compressed, multiplexed, and packetized. Where the function is enabled (based on some given threshold that is configured), compression and multiplexing is executed. Where such a function is disabled, cell site element 18 may act as a repeater or a buffer. Thus, DS0s may propagate into the device and be communicated over the backhaul as DS0s.

In an example embodiment, 8.60 framers 54*a-c* include software that is operable to execute this decision making process. Alternatively, 8.60 framers 54*a-c* may include application specific integrated circuits (ASICs), state machines, digital signal processors (DSPs), or any other suitable component, device, hardware, algorithm, element or object operable to perform these operations. In other embodiments, this decision making intelligence may be provided external to any of the elements of FIGS. 2A-B (e.g. via its own separate module) or positioned in any other suitable element, device, or component.

Forwarder 56 may associate a separate channel (both data and bearer information) to a selected primary or secondary instance 58, 60, or 62. Forwarder 56 may also distribute common control signals for the GSM architecture. Forwarder 56 is responsible for connecting the data and control streams of the selected 8.60 framer 54*a-c* to the appropriate instance (and providing a PW identifier to each stream). Each instance 58, 60, and 62 is connected to the AC state signal that is used for relaying data to peers (and for suppressing data). For each AC, a given primary instance 58 is allocated (e.g. via provisioning), which in addition to receiving the AC signal, can control the AC. Commands for the AC may be either self-generated by primary instance 58 or be received from a peer instance. Similarly, if any remote instance receives an error signal from their remotely attached AC, the local primary instance may also generate an alarm condition on the AC by using the command interface. Putting the AC in some alarm state has the effect of disabling framer 50 (and hence TDM data is discarded). This local state change may be reflected in the AC signal state, which may be reflected back to selected instances and reported to remote peers.

In operation of an example embodiment, voice calls may be coming into cell site element 18. There are different channels on a subrate DS0 that to which the calls are assigned. In most cases, there are four calls per DS0, although such may be configured differently (e.g. two or eight). As calls come in, those channels become either utilized or IDLE. When such channels are IDLE, they may be identified (e.g. via looking for IDLE frames in the active voice). 8.60 framer 54*a-c* could be responsible for such an operation, whereby it would take a time sample of the flow (e.g. 2 ms) and would send that amount of data to a multiplexing device. This device could identify the IDLE and silence bits and keep track of the state of each of the voice calls.

The decision process of enabling and disabling may be achieved by 8.60 framers 54*a-c*, which decide whether the information incoming to cell site element 18 should be forwarded (as is) or whether the information should be compressed, multiplexed, and packetized. Where the function is enabled, compression and multiplexing is executed. Where such a function is disabled, cell site element 18 may act as a repeater (the pass-through mode). The DS0s may propagate in and be communicated over the backhaul as DS0s.

Signaling may be exchanged between cell site element 18 and aggregation node 22 to indicate when switching occurs. For example, cell site element 18 may let aggregation node 22 know that it is switching from being a repeater (operating in a pass-through mode) to a compression/multiplexing engine for this particular DS0. Once the acknowledgement signal (e.g. an ACK) is received back from aggregation node 22, the designated operation may begin. When the switching occurs, there is the potential that a packet may be dropped. Such would result in noise or a slight degradation in voice quality during the transition. Note that when toggling between compression and non-compression operations, information may be inconsistent. For example, a frame may reflect information that is only partially compressed. Both cell site element 18 and aggregation node 22 are equipped to be able to address such a situation. Cell site element 18 and aggregation node 22 may recover such a frame and resolve it such that it may be salvaged and communicated to its appropriate next destination.

It should be noted that such toggling/switching operations should not be performed continuously. A switching operation may occur when network traffic reaches a certain level, whereby a switch back would occur once heavy traffic conditions have subsided. Accordingly, ON and OFF thresholds may be set such that the architecture does not experience toggling. User interfaces could be used to allow the user to configure the architecture in accordance with particular needs. In order to achieve even higher granularity, DS0 groups may be segmented. For example, instead of having a full E1 dedicated to the function, the dynamics of such operations may be achieved on multiple DS0 groups.

In the architecture provided by communication system 10, the selected 8.60 framer 54a-c may perform compression automatically in the form of idle and silence frame suppression. When IDLE (or non-active) or error patterns are present on the ingress stream, no TDM data may be sent to the PW compressor and no protocol data units (PDUs) are generated. Under these conditions, an srDS0 that is provisioned on the decompressor may generate the error pattern. This, by itself, saves bandwidth for channels that are provisioned but that have not been allocated to calls. When a valid frame is detected, TDM data may be transferred to the selected instance 58, 60, or 62 until frame synchronization is lost. During an uncompressed mode all valid bits may be encapsulated according to the data payload format and passed to a selected peer instance 58, 60, or 62 for synchronous playback. In this mode, bits (including synchronization bits and IDLE voice bits) may be transmitted and replayed.

In operation of an example compressing/multiplexing embodiment in the PW-bound direction, framer and time switch 50 delivers a set of N DS0s as a contiguous bit-stream to a selected 8.60 framer. Framer and time switch 50 may detect signals as defined by the particular AC (e.g. LOS on a T-1) and report this to forwarder 56. The selected 8.60 framer breaks each DS0 stream into M sub-rate DS0 bit-streams and delivers it to PW instance (M=2, 4, 8 per DS0). It may also detect srDS0 signals and pass these to the PW instance over the same multiplexed data/control path. When certain signal conditions (as defined more fully below) exist on the srDS0, null data may be sent to the PW instance by the framer. The PW instance encapsulates the srDS0 data/ctrl over a PSN protocol stack.

In the CE-bound direction, the PW takes the srDS0oPSN payload and delivers it to a selected 8.60 framer over the same multiplexed data/ctrl path. When no payloads are present, null data is sent to the selected 8.60 framer. The selected 8.60 framer may insert the data onto the N*DS0 stream along with other srDS0 streams. If needed, the selected 8.60 framer can translate a control signal from the PW instance (either self-generated or from the peer PW instance) into a bit pattern (e.g. IDLE), as defined below. Framer and time switch 50 (e.g. a G.704 framer) takes the DS0s and transmits them on the AC.

Note that the GSM compressor acts upon the bearer plane and is generally not cognizant of the control plane (i.e. call signaling). Since a GSM base transceiver station and base station controller are compliant with the GSM call control signaling requirements, they are aware when an srDS0 has been allocated to a call and when it is not. An srDS0 that is not allocated to a call is set to an IDLE state (alternating 10). Due to the fact that the GSMmux scheme is not aware of this, it is likely that the GSM 8.60 framer will play out an error pattern (indicating no valid frames) when it should be playing the IDLE pattern. As an enhancement for communication system 10, the compression scheme could use a timer that causes the GSM 8.60 framer to revert to the IDLE pattern if a predetermined number of valid frames is not received.

The AC may have the following generic signals: 1) Frame Alignment Signal (FAS) is a common term denoting a special periodic pattern that is used to impose synchronous structures on E1 and T1 circuits; 2) Alarm Indication Signal (AIS) is a common term denoting a special bit pattern in the TDM bit stream that indicates presence of an upstream circuit outage (for E1 and T1 circuits the AIS condition can be detected not only by the framers but also by Line Interface Units (LIU)); 3) Loss of Frame (LOF) is a common term denoting the state of the framer when the FAS could not be found for some predefined duration while the AIS condition is not experienced; 4) Remote Alarm Indication (RAI) is a common term denoting a special pattern in the framing of a TDM service that is sent back by the receiver that experiences some failure condition of the incoming service (including AIS and LOF); and 5) Loss of Signal (LOS) is a common term denoting the state of the framer when no insufficient signal levels are detected on the AC.

When any of these signals are detected by framer and time switch 50 (e.g. a G.704 framer), they may be interpreted to mean that the AC is Out-of-Service (OOS). This OOS indication may be propagated by forwarder 56 to the PW instance that indicate this state in the control stream sent to the peer PW instance. In response, the local PW (in this scenario) stops sending srDS0oPSN PDUs to the selected 8.60 framer and instead sends null data. The remote primary PW may command its remote AC to generate an AIS signal. This remote state change may be reflected to the remote PW instances that also stop sending srDS0oPSN PDUs to their remote 8.60 framer. The control stream between the peer PW instances however may remain in service (INSV) so that state changes can be reported and synchronization can be maintained in the example provided.

The srDS0 may have the following specific signal conditions that are handled by the selected 8.60 framer: 1) Start of Frame (SOF): after LOF (or initial/reset conditions), arrival of sixteen consecutive zeros followed by a one indicates the start of a 320-bit 8.60 frame. Note that SOP may occur repeatedly every twenty milliseconds (320-bits) if no LOF conditions are detected. Each consecutive SOP may indicate the beginning of a new frame or the abortion of the previous frame (if all 320-bits were not received); 2) Loss of Frame (LOF): after SOP, a one in every sixteenth bit is expected (the first being the bit that started the SOP). If not received, LOF is declared resulting in the peer PW instance reverting to the all zero (ERROR) state; 3) Error: all zeros indicating synchronization has been lost or some error has been detected upstream. Since all zeros can cause a LOF, this signal is not explicitly detected by the 8.60 framer. The stream of zeros may however be suppressed by the 8.60 framer (since it will result in a LOF) and hence not transmitted as PDUs (the peer 8.60 framer may play out the error pattern since the LOF signal was detected); 4) Loss of Sync (LOS): three consecutive twenty milliseconds frames had a synchronization error (i.e. during initial synchronization or monitor phase) [There is currently no reason to detect this particular pattern and so the 8.60 framer will generally not check for it unless designated otherwise; however, each individual LOS indication may be signaled to the 8.60 framer]; 5) Time Alignment (TA): The 320-bit frame is shortened or lengthened by anywhere from 0-20 ms in 250 micro-second increments (i.e. 4-bits), as specified by the C bits in the 8.60 frame; and 6) IDLE (GSM 8.54): a sub-rate channel (16 kb/s, 8 kb/s) not assigned to a call will transmit an IDLE pattern of 01 for a 16-kb/s sub-rate time slot and 0/1 in a 8 kb/s sub-rate time slot (0 or 1 determined by the position of this slot with reference to a larger 16-kb/s sub-rate channel).

The IDLE channels may be suppressed by the selected 8.60 framer (i.e. SOP never detected) and re-generated by the peer 8.60 framer as the default fill pattern (at least until the first valid frame is detected on this sub-rate channel). In addition, the srDS0 can be provisioned as OOS (indicated by the PE management system) in which case the framer may generate an IDLE pattern. If TDM data has not been received from the PW (for a provisioned and previously active srDS0), the ERROR pattern may be generated.

In one example referencing an 8.60-optimized payload compression model, the 8.60 framer may perform compression automatically in the form of invalid frame and bit-pattern suppression. When IDLE or ERROR patterns are present on the ingress stream, TDM data is not sent to the PW instance (compressor) and hence no PDUs are generated for that srDS0. Under these conditions, an srDS0 that is provisioned and active on the decompressor may generate the ERROR (all zero, inter-frame fill) pattern. When a valid frame is detected (i.e. SOF), TDM data (8/16/32/64-bit words) may be transferred to the PW (including the initial sixteen zero synchronization bits) until frame synchronization is lost.

While the TDM data from the framer is valid, the compressor may perform the following: 1) scan the valid bits from the 8.60 framer to find the 8.60 control word (CW) [this may be contained in the initial valid words after a LOF/EOF]. If the CW indicates the frame is voice silence, the compressor sends the CW bits to the PW peer (decompressor) and sets a flag indicating compression has started for this frame. The PDU for this srDS0 could actually contain some number of voice silence bits. Otherwise, the word is passed to the PW for transmission. 2) The decompressor receives the CW (with possible extraneous bits) and plays it out to the 8.60 framer. It then sets a flag indicating this frame is being compressed (and to remember to play out the predetermined silence pattern (all 1s) until the next valid frame is received from the compressor). The decompressor may calculate the maximum number of bits that should be played out before receiving the next valid frame from the decompressor (i.e. the ending CW). The decompressor may look for the sixteen zeros frame separator in order to determine when the frame has begun. 3) The next time payload from an srDS0 is used from the CESoPSN payload multiplexer, an empty payload is returned. This is encoded in the CESoPSN payload format (i.e. the bitmap). 4) If an error is detected by the compressor, the decompressor is generally not informed. The decompressor may continue to play out the silence pattern (all 1s) until its counter runs out and then resorts to the ERROR pattern. When the error is recovered, a SOF indication will be received by the compressor, which may re-start the process.

The 8.60 payload format may contain a payload present (PP) field that is a bit-mask of N-bits (max 256-bits, typically 96-bits or 12-bytes) where N is established based on the state of the PW (N is padded as needed to hit a byte boundary) and, in particular, the number of srDS0s that are INSV or OOS. Each bit in the mask may correspond to an srDS0 that is specified in the PW provisioning data. When the bit is set, the fixed sized payload is present for this srDS0. Payloads that are not present are still indicated to the related PW for synchronization purposes.

The CE-bound PW instance includes a jitter buffer that accumulates data from incoming CESoPSN packets with their respective UDPmux sequence numbers. The length of this buffer is configurable to allow adaptation to various network delay behavior patterns. Size of the jitter buffer is a local parameter of the CESoPSN PW.

Initially, the 8.60 framer is configured to generate IDLE (or ERROR). Immediately after the start, the PW: 1) begins reception of incoming UDPmux packets. PSN headers are stripped from the received packets, packetized TDM data from the received packets is stored in the jitter buffer. 2) The framer continues to play out IDLE (or ERROR) as long as the jitter buffer has not yet accumulated a sufficient amount of data. 3) Once the jitter buffer contains a sufficient amount of data (usually half of its capacity), the PW may start replay of this data to its end service in accordance with its (locally defined) clock. At this time, the IDLE (or ERROR) pattern of the framer is disabled and now it expects to receive TDM data continuously. The preceding discussion offers one example operation for communication system 10. Other operations may be readily accommodated and based on particular configuration or architecture arrangements and/or needs.

Figure 3:
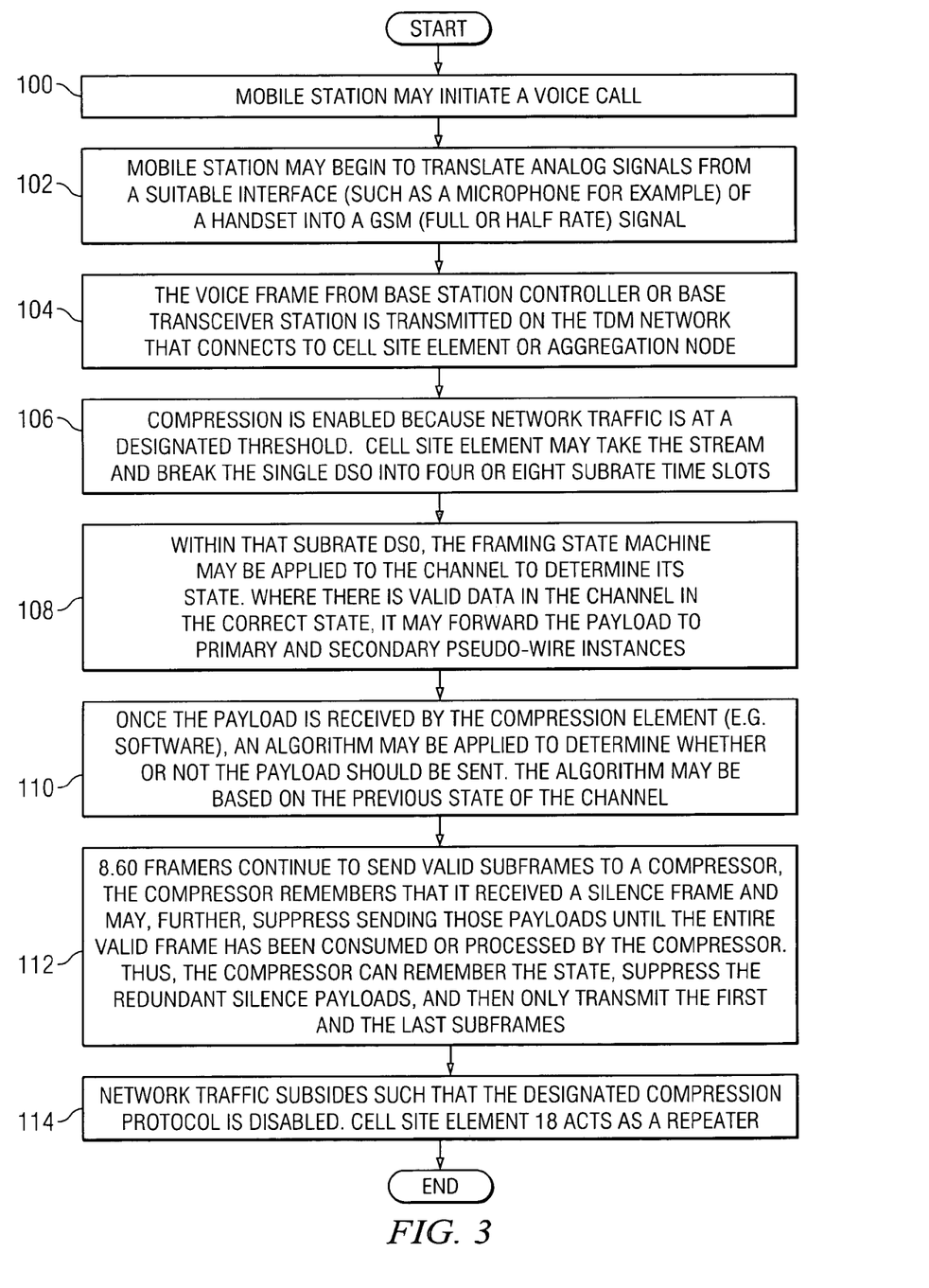
FIG. 3 is a simplified flowchart illustrating a series of example steps associated with the communication system.

FIG. 3 is a simplified flowchart illustrating a series of example steps associated with a method for compressing and multiplexing voice data in a communications environment. The method addresses one type of compression, but may be readily used with numerous other types where appropriate. The method may begin at step 100 where mobile station 13 or mobile switching center (MSC) 25 may initiate a voice call. These two elements may negotiate a time slot or DS0 within the backhaul between base transceiver station 16 and base station controller 24. These elements may then be assigned for that particular voice call. At step 102, mobile station 13 may begin to translate analog signals from a suitable interface (such as a microphone for example) of a handset into a GSM (full or half rate) signal. This is a digital representation of the voice data that may be effectuated in a 20 ms period, which represents the packetization period of the system. (Note that the packetization period of the GSM system (20 ms) is different from the packetization period of the transport/compression/decompression system or "frame period," which has a much lower packetization period (e.g. 5 ms). This may be done by mobile station 13 in cooperation with a transcoder.

At step 104, the voice frame from base station controller 24 or base transceiver station 16 is transmitted on the TDM network that connects to cell site element 18 or aggregation node 22. Thus, in this example embodiment, the end user is speaking into mobile station 13, which converts analog voice signals into GSM full rate or half rate digital samples. The samples are transmitted on an eight or a sixteen kilo-bit radio time slot or channel to the base transceiver station 16 over the air. Base transceiver station 16 transfers that frame over the A-bis backhaul interface toward cell site element 18.

In this example scenario, compression has been enabled because network traffic has exceeded a designated-threshold. This may be recognized by cell site element 18 (e.g. via 8.60 framers 54a-c). Cell site element 18 may take the stream and break the single DS0 into four or eight subrate time slots at step 106. This may be performed, for example, by 8.60 framers 54a-c. Within that subrate DS0, the framing state machine may be applied to the channel to determine its state at step 108. Where there is valid data in the channel in the correct state, it may forward the payload to primary and secondary pseudo-wire instances 58, 60, and 62. These elements may execute the compression operations to be performed in the architecture. Once the payload is received by the compression element (e.g. software), an algorithm may be applied to determine whether or not the payload should be sent at step 110. The algorithm may be based on the previous state of the channel.

For example, in the case of silence where an end user is not speaking, mobile station 13 may blank out the transmission. This condition is detected by base transceiver station 16 (i.e. cell site element 18 included therein). Base transceiver station 16 may respond by filling the TDM stream with a valid frame representing silence. 8.60 framers 54*a-c* may detect this condition (a valid frame) but pass all the payload bits to a compressor (i.e. primary and secondary pseudo-wire instances 58, 60, and 62). The compressor, which tracks the state of the frame, may evaluate the first or second subframes within that stream and determine that the frame is actually a silence frame. The fact that a silence frame has actually been received may then be recorded. 8.60 framers 54*a-c* continue to send valid subframes to a compressor (i.e. primary and secondary pseudo-wire instances 58, 60, and 62), the compressor remembers that it received a silence frame and may, further, suppress sending those payloads until the entire valid frame has been consumed or processed by the compressor: consumed but not transmitted to the other side. Thus, the compressor can remember the state, suppress the redundant silence payloads, which are small subframes, and then only transmit the first and the last subframes. This is illustrated by step 112. The last subframe may contain control information, which cannot be suppressed. The first subframe may similarly contain control information, which cannot be suppressed. But the intermediate subframes of silence are generally not communicated by the compressor to the other side.

At step 114, network traffic may subside such that it falls below the designated threshold. In such a case, 8.60 framers 54*a-c* may identify this parameter, disable the compression/multiplexing, and direct cell site element 18 to act as a repeater. Note that this dynamic shift is not continuous. The decline in network traffic reflects a trend in activity for that given time interval such that toggling is generally avoided.

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of the described elements may be provided as separate external components to communication system 10 or to each other where appropriate. The present invention contemplates great flexibility in the arrangement of these elements as well as their internal components.

In addition, although the preceding description offers a compression protocol to be implemented with particular devices (e.g. aggregation node 22 and cell site element 18), the compression/suppression protocol provided may be embodied in a fabricated module that is designed specifically for effectuating the techniques provided above. Moreover, such a module may be compatible with any appropriate protocol other than the 8.60 platform, which was offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for communicating data, comprising:
a cell site element associated with a base transceiver station and operable to:
    receive a plurality of bits associated with a communications flow, the communications flow associated with one or more communication channels; and
    elect whether to perform compression and multiplexing operations based on a level of traffic propagating in a network by:
        monitoring link utilization on a span from the cell site element to the base transceiver station;
        identifying one or more idle communications channels of the plurality of communications channels;
        determining whether a predetermined link utilization level has been reached; and
        selecting one or more of the idle communications channels for compression if the predetermined link utilization level has been reached.

2. The apparatus of claim 1, further comprising:
an aggregation node associated with a base station controller and operable to receive the communications flow from the cell site element.

3. The apparatus of claim 1, wherein the cell site element further includes an 8.60 framer that is operable to determine whether to disable or enable the compression and multiplexing operations for the cell site element.

4. The apparatus of claim 1, wherein the cell site element further includes a bandwidth monitoring element operable to determine whether or not to perform the compression and multiplexing operations based on the level of traffic propagating in the network.

5. The apparatus of claim 4, wherein the bandwidth monitoring element directs a compressor to initiate compression for the plurality of bits associated with the communications flow based on whether the bandwidth monitoring element is in a pass-through mode or a compression and multiplexing mode.

6. The apparatus of claim 1, wherein the cell site element is operable to recover a portion of a frame associated with the communications flow and to communicate it to a next destination, the portion reflecting an element that is partially compressed.

7. The apparatus of claim 1, wherein the cell site element further comprises an algorithm operable to track a state of a channel associated with the communications flow, and wherein the state of the channel is a selected one of an IDLE state, an ERROR state, an ACTIVE state, and a SILENCE state.

8. The apparatus of claim 1, wherein the cell site element may shift between the compression and multiplexing operations and acting as a repeater for the communications flow in response to the level of traffic propagating in the network.

9. A method for communicating data, comprising:
receiving a plurality of bits associated with a communications flow, the communications flow associated with one or more communication channels; and
electing whether to perform compression and multiplexing operations based on a level of traffic propagating in a network by:
monitoring link utilization on a span from the cell site element to the base transceiver station;
identifying one or more idle communications channels of the plurality of communications channels;
determining whether a predetermined link utilization level has been reached; and
selecting one or more of the idle communications channels for compression if the predetermined link utilization level has been reached.

10. The method of claim 9, further comprising:
receiving the communications flow in a compressed format when the level of traffic propagating in the network has reached a designated threshold.

11. The method of claim 9, further comprising:
executing a selected one of disabling and enabling for the compression and multiplexing operations in response to the level of traffic.

12. The method of claim 9, further comprising:
directing a compressor to initiate compression for the plurality of bits associated with the communications flow based on whether a bandwidth monitoring element is in a pass-through mode or a compression and multiplexing mode.

13. The method of claim 9, further comprising:
tracking a state of a channel associated with the communications flow; and
detecting the state of the channel, the state being a selected one of an IDLE state, an ERROR state, an ACTIVE state, and a SILENCE state.

14. The method of claim 9, further comprising:
recovering a portion of a frame associated with the communications flow, the portion reflecting an element that is partially compressed;
resolving the portion such that contents of the frame are substantially compressed; and
communicating the portion to a next destination.

15. A system for compressing data, comprising:
means for receiving a plurality of bits associated with a communications flow, the communications flow associated with one or more communication channels; and
means for electing whether to perform compression and multiplexing operations based on a level of traffic propagating in a network by:
monitoring link utilization on a span from the cell site element to the base transceiver station;
identifying one or more idle communications channels of the plurality of communications channels;
determining whether a predetermined link utilization level has been reached; and
selecting one or more of the idle communications channels for compression if the predetermined link utilization level has been reached.

16. The system of claim 15, further comprising:
means for receiving the communications flow in a compressed format when the level of traffic propagating in the network has reached a designated threshold.

17. The system of claim 15, further comprising:
means directing a compressor to initiate compression for the plurality of bits associated with the communications flow based on whether a bandwidth monitoring element is in a pass-through mode or a compression and multiplexing mode.

18. The system of claim 15, further comprising:
means for tracking a state of a channel associated with the communications flow; and
means for detecting the state of the channel, the state being a selected one of an IDLE state, an ERROR state, an ACTIVE state, and a SILENCE state.

19. The system of claim 15, further comprising:
means for recovering a portion of a frame associated with the communications flow, the portion reflecting an element that is partially compressed;
means for resolving the portion such that contents of the frame are substantially compressed; and
means for communicating the portion to a next destination.

20. A computer readable medium comprising software for communicating data, the software comprising computer code such that when executed is operable to:
receive a plurality of bits associated with a communications flow, the communications flow associated with one or more communication channels; and
elect whether to perform compression and multiplexing operations based on a level of traffic propagating in a network by:
monitoring link utilization on a span from the cell site element to the base transceiver station;
identifying one or more idle communications channels of the plurality of communications channels;
determining whether a predetermined link utilization level has been reached; and
selecting one or more of the idle communications channels for compression if the predetermined link utilization level has been reached.

21. The medium of claim 20, wherein the code is further operable to:
receive the communications flow in a compressed format when the level of traffic propagating in the network has reached a designated threshold.

22. The medium of claim 20, wherein the code is further operable to:
execute a selected one of disabling and enabling for the compression and multiplexing operations in response to the level of traffic.

23. The medium of claim 20, wherein the code is further operable to:
direct a compressor to initiate compression for the plurality of bits associated with the communications flow based on whether a bandwidth monitoring element is in a pass-through mode or a compression and multiplexing mode.

24. The medium of claim 20, wherein the code is further operable to:
track a state of a channel associated with the communications flow; and
detect the state of the channel, the state being a selected one of an IDLE state, an ERROR state, an ACTIVE state, and a SILENCE state.

25. The medium of claim 20, wherein the code is further operable to:

recover a portion of a frame associated with the communications flow, the portion reflecting an element that is partially compressed;

resolve the portion such that contents of the frame are substantially compressed; and communicate the portion to a next destination.

* * * * *